US007801672B2

(12) United States Patent
Ueda

(10) Patent No.: US 7,801,672 B2

(45) Date of Patent: Sep. 21, 2010

(54) AFTER-STOP FUEL PRESSURE CONTROL DEVICE OF DIRECT INJECTION ENGINE

(75) Inventor: Kuniaki Ueda, Toyota (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 12/265,377

(22) Filed: Nov. 5, 2008

(65) Prior Publication Data

US 2009/0118991 A1 May 7, 2009

(30) Foreign Application Priority Data

Nov. 7, 2007 (JP) ............................ 2007-290223

(51) Int. Cl.
*G06F 19/00* (2006.01)
*G06G 7/70* (2006.01)

(52) U.S. Cl. ............... 701/112; 123/179.4; 123/179.17; 701/113

(58) Field of Classification Search ................. 701/112, 701/113; 123/467, 179.4, 447, 456, 457, 123/494, 98 D, 179.3, 179.16, 179.17, 179.18
See application file for complete search history.

(56) References Cited

U.S. PATENT DOCUMENTS 5,979,400 A * 11/1999 Nishide ...................... 123/305
7,027,911 B2 4/2006 Nishikawa et al.
7,177,755 B2 2/2007 Nishikawa et al.
2001/0023683 A1* 9/2001 Nakamura et al. .......... 123/457
2009/0070020 A1* 3/2009 Tetsuno ...................... 701/113

FOREIGN PATENT DOCUMENTS

EP 1 707 784 10/2006
JP 2005-042589 2/2005
JP 2005-264902 9/2005
JP 2006-57524 3/2006

* cited by examiner

*Primary Examiner*—Stephen K Cronin
*Assistant Examiner*—Anthony L Bacon
(74) *Attorney, Agent, or Firm*—Nixon & Vanderhye, PC

(57) ABSTRACT

A pressure reducing valve is provided for reducing fuel pressure in a high-pressure fuel system, which supplies high-pressure fuel from a high-pressure pump to an injector, after an engine stops. An ECU detects or estimates an engine stop position when the engine stops and sets after-stop target fuel pressure in accordance with the detected or estimated engine stop position. The ECU controls a valve opening action of the pressure reducing valve to reduce the fuel pressure in the high-pressure fuel system to the after-stop target fuel pressure after the engine stops. In the control, the ECU sets the after-stop target fuel pressure to be lower as a piston position of a cylinder in a compression stroke at the engine stop position is closer to a top dead center.

8 Claims, 6 Drawing Sheets

AFTER-STOP FUEL PRESSURE CONTROL DEVICE OF DIRECT INJECTION ENGINE

CROSS REFERENCE TO RELATED APPLICATION

This application is based on and incorporates herein by reference Japanese Patent Application No. 2007-290223 filed on Nov. 7, 2007.

BACKGROUND OF THE INVENTION

1. Field of the Invention

The present invention relates to an after-stop fuel pressure control device of a direct injection engine having a pressure reducing mechanism for reducing pressure of fuel (fuel pressure) in a high-pressure fuel system after an engine stops.

2. Description of Related Art

A time from injection to combustion of a direct injection engine that injects fuel directly into a cylinder is shorter than that of an intake port injection engine that injects fuel to an intake port. Accordingly, the direct injection engine cannot have a sufficient time for atomizing the injected fuel and is required to increase injection pressure to high pressure to atomize the injected fuel. A certain direct injection engine (for example, refer to Patent document 1. JP-A-2005-264902) is structured such that fuel drawn from a fuel tank with a low-pressure pump is supplied to a high-pressure pump driven by a camshaft of the engine and the high-pressure fuel discharged by the high-pressure pump is pumped to an injector through a high-pressure fuel pipe.

Generally, the high-pressure pump has a check valve for preventing a backflow of the discharged fuel, thereby maintaining the fuel pressure in the high-pressure fuel pipe at high pressure. However, if the fuel pressure in the high-pressure fuel pipe is maintained at the high pressure after the engine stops, a quantity of fuel leakage from the injector (i.e., oil-tightness leak amount) tends to increase during the engine stoppage. As a result, there occurs a problem that the leak fuel accumulates in the cylinder and is discharged in an unburned state in next starting, deteriorating an exhaust emission at the starting.

As measures against such the problem, the engine described in Patent document 1 is provided with an electromagnetic relief valve in a predetermined position of a high-pressure fuel system (such as a delivery pipe, the high-pressure fuel pipe and the high-pressure pump) that supplies the high-pressure fuel from the high-pressure pump to the injector. After the engine stops, the relief valve is opened to reduce the fuel pressure in the high-pressure fuel system to pressure on the low-pressure pump side.

A fuel pressure control device of a direct injection engine described in Patent document 2 (JP-A-2005-207339) controls a fuel pressure control valve immediately before stopping an engine such that the engine is stopped after fuel pressure in a high-pressure fuel system is reduced to after-stop target fuel pressure set in consideration of startability and the like. No electromagnetic relief valve is provided in this system.

In recent years, in order to shorten a starting time, it has been a technical problem of the direct injection engine to realize single compression starting of starting the engine by causing the first explosion in a cylinder, which is in the first compression stroke in the starting. However, there is a possibility that the technology described in Patent document 1 or 2 fails in the single compression starting because of following reasons depending on an engine stop position.

During the engine stoppage, a compressed air in the cylinder in the compression stroke leaks from gaps of a combustion chamber (such as a gap around a piston and a gap around a suction valve or an exhaust valve) and cylinder pressure decreases. If cranking is started thereafter, the air in the cylinder in the first compression stroke is compressed again when a piston ascends. The initial position of the piston as of the start of the cranking varies with engine stop timing. Therefore, the maximum cylinder pressure in the cylinder in the first compression stroke (i.e., the cylinder pressure at the time when the piston of the cylinder in the first compression stroke ascends to the top dead center) varies with the initial position of the position as of the start of the cranking.

The technology of Patent document 2 uniformly sets the after-stop target fuel pressure regardless of the engine stop position. Therefore, depending on the initial position of the piston as of the start of the cranking, there is a possibility that the initial fuel pressure as of the start of cranking (i.e., the pressure for injecting the fuel into the cylinder in the compression stroke) does not become the optimum fuel pressure for the single compression starting. Therefore, for example, if the initial fuel pressure as of the start of the cranking becomes excessively low, there is a possibility that the fuel injection pressure becomes insufficient with respect to the maximum cylinder pressure of the cylinder in the first compression stroke and the single compression starting fails. If the after-stop target fuel pressure is set relatively high as measures against such the problem, there can occur a problem that the fuel leakage (oil-tightness leakage) from the injector during the engine stoppage increases.

SUMMARY OF THE INVENTION

It is an object of the present invention to provide an after-stop fuel pressure control device of a direct injection engine enabling single compression starting even at an engine stop position, at which the single compression starting has failed conventionally, while reducing fuel leakage (oil-tightness leakage) from an injector during engine stoppage by reducing fuel pressure in a high-pressure fuel system after the engine stops.

According to an aspect of the present invention, an after-stop fuel pressure control device of a direct injection engine including a pressure reducing mechanism for reducing pressure of fuel in a high-pressure fuel system, which supplies high-pressure fuel from a high-pressure pump to an injector after the engine stops has an engine stop position determining section, an after-stop target fuel pressure setting section, and an after-stop fuel pressure controlling section. The engine stop position determining section detects or estimates an engine stop position. The after-stop target fuel pressure setting section sets after-stop target fuel pressure in accordance with the engine stop position detected or estimated by the engine stop position determining section. The after-stop fuel pressure controlling section controls the pressure reducing mechanism to reduce the fuel pressure in the high-pressure fuel system to the after-stop target fuel pressure after the engine stops.

Thus, the after-stop target fuel pressure can be set in accordance with the engine stop position. Therefore, the after-stop target fuel pressure can be set in accordance with the engine stop position such that the fuel pressure in the high-pressure fuel system is reduced to as low fuel pressure as possible within a range, in which the single compression starting is possible. As a result, while the fuel leakage (the oil-tightness leakage) from the injector during the engine stoppage is reduced, the single compression starting can be performed by setting the after-stop target fuel pressure in accordance with the engine stop position even when the engine stop position is a position where the single compression starting has failed conventionally.

According to another aspect of the present invention, the after-stop target fuel pressure setting section sets the after-stop target fuel pressure to be lower as a piston position of a cylinder in a compression stroke at the engine stop position is closer to a top dead center.

The maximum cylinder pressure of the cylinder in the compression stroke at the restart (i.e., the cylinder pressure at the time when the piston ascends to the top dead center) decreases as the piston position of the cylinder in the compression stroke at the engine stop position is closer to the top dead center. The fuel injection pressure (i.e., differential pressure between the fuel pressure and the maximum cylinder pressure) necessary for the single compression starting can be secured with the lower fuel pressure as the maximum cylinder pressure of the cylinder in the compression stroke decreases. Therefore, the above-described construction is effective.

According to another aspect of the present invention, the after-stop target fuel pressure setting section sets the after-stop target fuel pressure such that the after-stop target fuel pressure is higher than cylinder pressure (the maximum cylinder pressure) at a time when a piston of a cylinder in a compression stroke at the engine stop position ascends to a top dead center in restart by predetermined pressure. By setting the predetermined pressure at the minimum necessary fuel injection pressure (i.e., differential pressure between the fuel pressure and the maximum cylinder pressure) necessary for the single compression starting, the minimum necessary fuel injection pressure necessary for the single compression starting can be surely secured in accordance with the engine stop position.

The after-stop fuel pressure control according to the present invention can be also applied to and implemented in the case where a driver performs switch off operation of an ignition switch and stops the engine.

In addition, according to another aspect of the present invention, the after-stop fuel pressure control device further has an idle stop section for controlling automatic stop and automatic restart of the engine. The after-stop fuel pressure controlling section reduces the fuel pressure in the high-pressure fuel system to the after-stop target fuel pressure during the automatic stop of the engine performed by the idle stop section. The idle stop section performs fuel injection and ignition in a cylinder in the first compression stroke in the automatic restart, thereby causing the first explosion and starting the engine.

The fuel pressure in the high-pressure fuel system leaks gradually during the engine stoppage. Therefore, if the engine stoppage time extends, there is a possibility that the fuel pressure necessary for the single compression starting cannot be secured due to the leak of the fuel pressure of the high-pressure fuel system during the engine stoppage. Generally, the idle stop time is short and the automatic restart is performed immediately in many cases. Therefore, it is presumed that the fuel pressure in the high-pressure fuel system is still maintained near the after-stop target fuel pressure at the automatic restart after the idle stop. Therefore, by applying the present invention to a vehicle having the idle stop system, the single compression starting can be performed at the automatic restart after the idle stop by setting the after-stop target fuel pressure in accordance with the engine stop position even when the engine stop position in the idle stop is a position where the single compression starting has failed conventionally. Thus, automatic restart performance can be improved.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
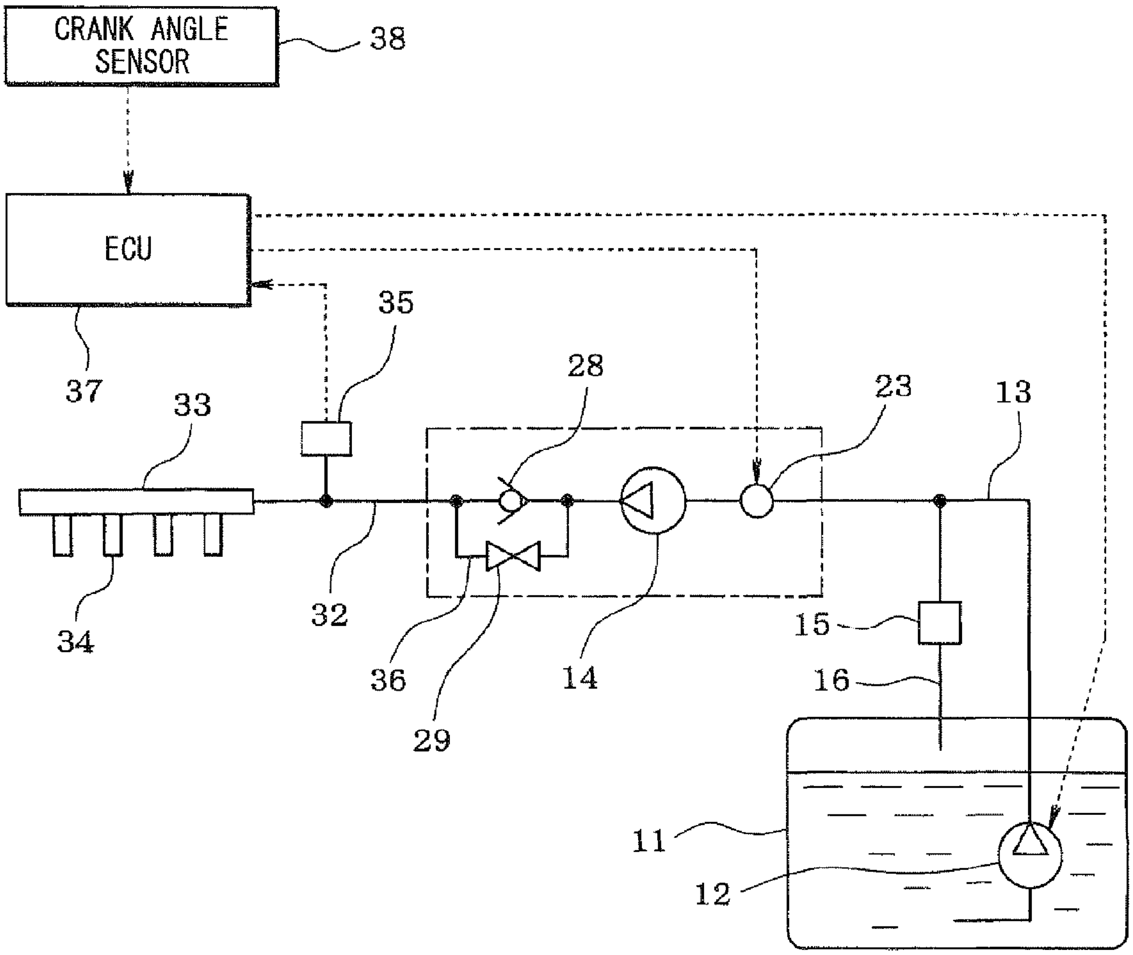
FIG. 1 is a schematic configuration diagram illustrating a high-pressure fuel supply system according to an embodiment of the present invention.

Hereafter, an embodiment of the present invention will be described with reference to the drawings. First, a general configuration of an entire high-pressure fuel supply system of a direct injection engine will be explained with reference to FIG. 1.

A low-pressure pump 12 for drawing up fuel is provided in a fuel tank 11 storing the fuel. The low-pressure pump 12 is driven by an electric motor (not shown), which uses a battery (not shown) as a power supply. The fuel discharged by the low-pressure pump 12 is supplied to a high-pressure pump 14 through a fuel pipe 13. A pressure regulator 15 is connected to the fuel pipe 13 for regulating discharge pressure of the low-pressure pump 12 (i.e., fuel supply pressure to the high-pressure pump 14) to predetermined pressure. Excessive portion of the fuel causing the pressure exceeding the predetermined pressure is returned into the fuel tank 11 through a fuel-return pipe 16.

Figure 2:
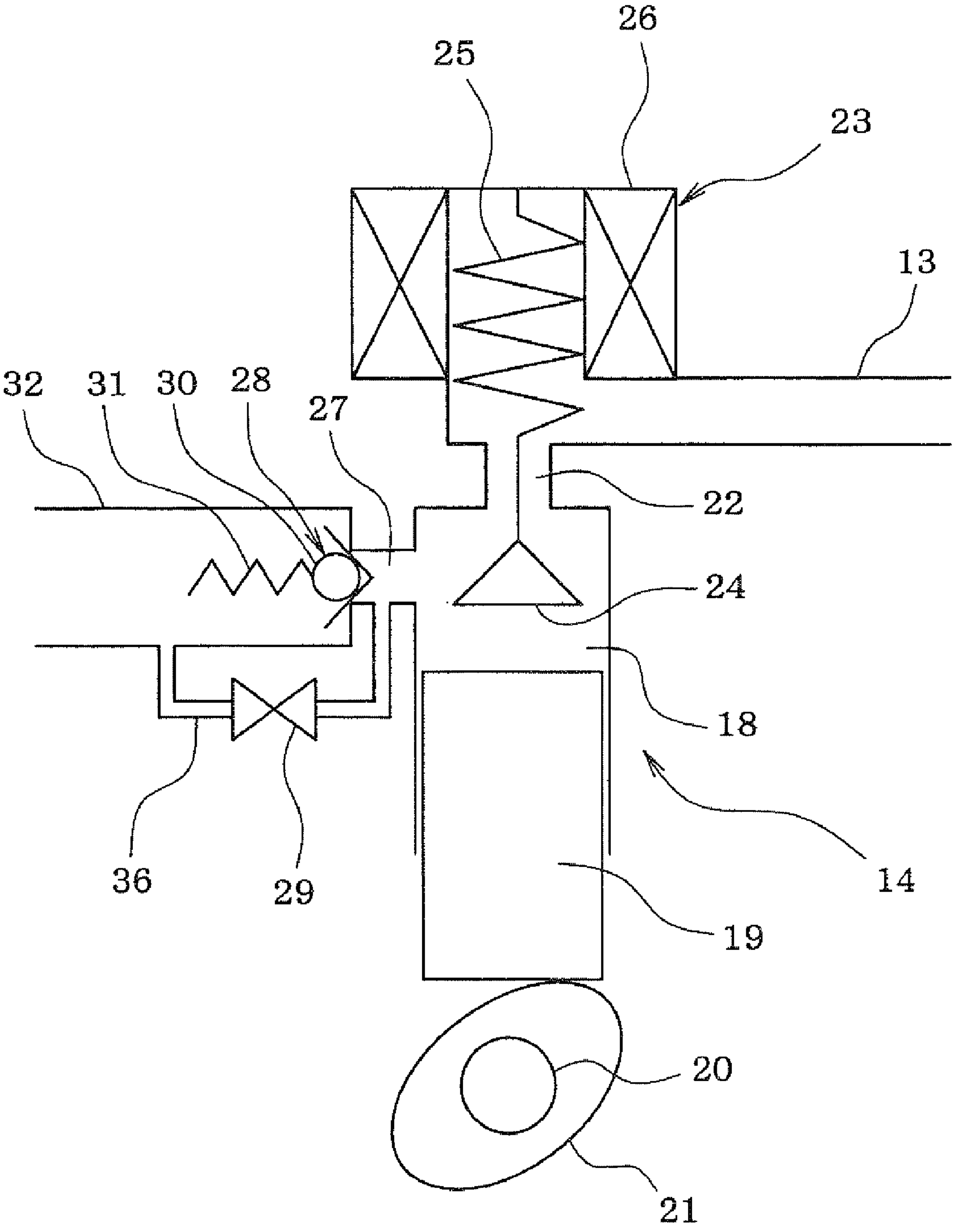
FIG. 2 is a schematic configuration diagram illustrating a high-pressure pump according to the embodiment.

As shown in FIG. 2, the high-pressure pump 14 is a piston pump that suctions/discharges the fuel by reciprocating a piston 19 in a cylindrical pump chamber 18. The piston 19 is driven by rotary motion of a cam 21 fitted to a camshaft 20 of the engine. A fuel pressure control valve 23 is provided on a suction port 22 side of the high-pressure pump 14. The fuel pressure control valve 23 is a normally open type electromagnetic valve and consists of a valve member 24 for opening/closing the suction port 22, a spring 25 for biasing the valve member 24 in a valve opening direction, and a solenoid 26 for electromagnetically driving the valve member 24 in a valve closing direction.

The fuel pressure control valve 23 is opened to suction the fuel into the pump chamber 18 in a suction stroke of the high-pressure pump 14 (i.e., when the piston 19 descends). A valve closing time of the fuel pressure control valve 23 (i.e., a time of a valve closing state from valve-closing start timing to a top dead center of the piston 19) is controlled in a discharge stroke (i.e., when the piston 19 ascends). Thus, the discharge quantity of the high-pressure pump 14 is controlled to control fuel pressure (i.e., discharge pressure) in a high-pressure fuel system on the discharge side of the high-pressure pump 14.

When the fuel pressure in the high-pressure fuel system is to be increased, the valve-closing start timing (i.e., energization timing) of the fuel pressure control valve 23 is advanced to lengthen the valve closing time of the fuel pressure control valve 23, thereby increasing the discharge quantity of the high-pressure pump 14. When the fuel pressure in the high-pressure fuel system is to be decreased, the valve-closing start timing (i.e., the energization timing) of the fuel pressure control valve 23 is delayed to shorten the valve closing time of the fuel pressure control valve 23, thereby decreasing the discharge quantity of the high-pressure pump 14.

A check valve 28 for preventing a backflow of the discharged fuel is provided on a discharge port 27 side of the high-pressure pump 14. The check valve 28 consists of a valve member 30 for opening/closing the discharge port 27 and a spring 31 for biasing the valve member 30 in a valve closing direction. The check valve 28 is held with the spring 31 at a valve closing state when the fuel is not discharged from the high-pressure pump 14, thereby preventing the backflow of the fuel in the high-pressure fuel system.

A bypass flow passage 36 bypassing the check valve 28 is provided on the discharge port 27 side of the high-pressure pump 14. A pressure reducing valve 29 (a pressure reducing mechanism) is provided in the bypass flow passage 36. The pressure reducing valve 29 consists of a normally closed type electromagnetic valve, for example. An ECU 37 (described in detail later) controls ON/OFF of energization to the pressure reducing valve 29. If the pressure reducing valve 29 is energized, the pressure reducing valve 29 opens and part of the fuel in the high-pressure fuel system flows into the high-pressure pump 14 from the pressure reducing valve 29 through the bypass flow passage 36 and is returned into the fuel tank 11 through the fuel pipe 13 on the low-pressure side. Thus, the fuel pressure in the high-pressure fuel system decreases. If the energization to the pressure reducing valve 29 is stopped, the pressure reducing valve 29 closes and the fuel pressure in the high-pressure fuel system is held.

As shown in FIG. 1, the fuel discharged from the high-pressure pump 14 opens the check valve 28 with the discharge pressure of the fuel and is sent to a delivery pipe 33 through a high-pressure fuel pipe 32. The high-pressure fuel is distributed from the delivery pipe 33 to injectors 34, each of which is fixed to a cylinder head of the engine for each cylinder. A fuel pressure sensor 35 for sensing the fuel pressure in the high-pressure fuel pipe 32 (i.e., the fuel pressure in the high-pressure fuel system) is provided to the high-pressure fuel pipe 32.

A vehicle according to the present embodiment has the above-described high-pressure fuel supply system and a direct injection engine. In addition, the vehicle has an idle stop system (an idle stop device) that automatically stops the engine (as idle stop) if a predetermined idle stop condition is satisfied during temporary stoppage of the vehicle and that automatically restarts the engine if an automatic restart condition is satisfied when a driver performs a preparation operation for vehicle start (such as brake release or gear shift lever operation) or vehicle start operation (such as accelerator pressing operation).

A crank angle sensor 38 is provided to the direct injection engine mounted in the vehicle and outputs a pulse signal at every specified crank angle in synchronization with rotation of a crankshaft. Engine rotation speed is sensed based on an interval (pulse generation frequency) of the crank pulse outputted from the crank angle sensor 38. Moreover, a reference position is detected using an output pulse of a cam angle sensor (not shown) and the crank pulse outputted from the crank angle sensor 38 is counted to sense a crank angle based on the count value.

The engine control circuit 37 (referred to as ECU hereinafter) that controls the operation of the engine is constituted mainly by a microcomputer. The ECU 37 performs feedback control of the discharge quantity of the high-pressure pump 14 (i.e., the energization timing of the fuel pressure control valve 23) to conform the fuel pressure in the high-pressure fuel system (i.e., the pressure of the fuel supplied to the injector 34), which is sensed with the fuel pressure sensor 35 during the engine operation, to target fuel pressure. In order to enable detection of an engine stop position even when an engine rotation direction is reversed during an engine rotation stopping process, the ECU 37 determines whether the engine rotation direction is reversed or not based on whether the output of the crank angle sensor 38 changes stepwise during the engine stopping process. If it is determined that the engine rotation direction is reversed, the count value of the crank pulse outputted from the crank angle sensor 38 is decremented (reduced) by one every time the crank pulse is outputted from the crank angle sensor 38 (that is, every time the reverse rotation of a specified crank angle occurs). Thus, the ECU 37 can detect the engine stop position from the count value of the crank pulse at the time when the engine stops. Thus, the ECU 37 functions as an engine stop position determining section. The above-described technology for detecting the reverse rotation in the engine rotation direction is described in JP-A-2005-42589, for example.

The detection method of the engine stop position is not limited to the above-described method. For example, as described in JP-A-2004-245105 or JP-A-2006-57524, a parameter (for example, engine rotation speed) indicating rotary motion of the engine and a parameter (for example, a work amount due to various losses) hindering the rotary motion of the engine may be calculated at every specified crank angle during the engine rotation stopping process, and the engine stop position may be estimated based on the parameter indicating the rotary motion of the engine and the parameter hindering the rotary motion of the engine.

During the idle stop, the ECU 37 controls the opening/closing action (i.e., ON/OFF of the energization) of the pressure reducing valve 29 to reduce the fuel pressure in the high-pressure fuel system, which is sensed with the fuel pressure sensor 35, to after-stop target fuel pressure set by a method described in detail later. The ECU 37 performs fuel injection and ignition in the cylinder in the first compression stroke at the subsequent automatic restart, thereby causing the first explosion and starting the engine (as single compression starting).

During the engine stoppage, the compressed air in the cylinder in the compression stroke leaks from gaps of the combustion chamber (such as a gap around the piston and a gap around a suction valve or an exhaust valve) and the cylinder pressure decreases. Therefore, if cranking is started thereafter, the air in the cylinder in the first compression stroke is compressed again by the ascent of the piston. The initial position of the piston as of the start of the cranking varies depending on the engine stop timing. Accordingly, the maximum cylinder pressure of the cylinder in the first compression stroke (i.e., the cylinder pressure at the time when the piston of the cylinder in the first compression stroke ascends to the top dead center) varies with the initial position of the piston as of the start of the cranking.

Therefore, if the after-stop target fuel pressure is set uniformly regardless of the engine stop position as in the conventional technology, there is a possibility that the initial fuel pressure as of the start of the cranking (i.e., the pressure for injecting the fuel into the cylinder in the compression stroke) does not become the optimum fuel pressure for the single compression starting, depending on the initial position of the piston as of the start of the cranking. As a result, for example, if the initial fuel pressure as of the start of the cranking becomes excessively low, there is a possibility that the fuel injection pressure becomes insufficient with respect to the maximum cylinder pressure of the cylinder in the first compression stroke and the single compression starting fails. If the after-stop target fuel pressure is set relatively high as the measures against the above problem, there occurs a problem that the fuel leakage (oil-tightness leakage) from the injector during the engine stoppage increases.

Figure 3:
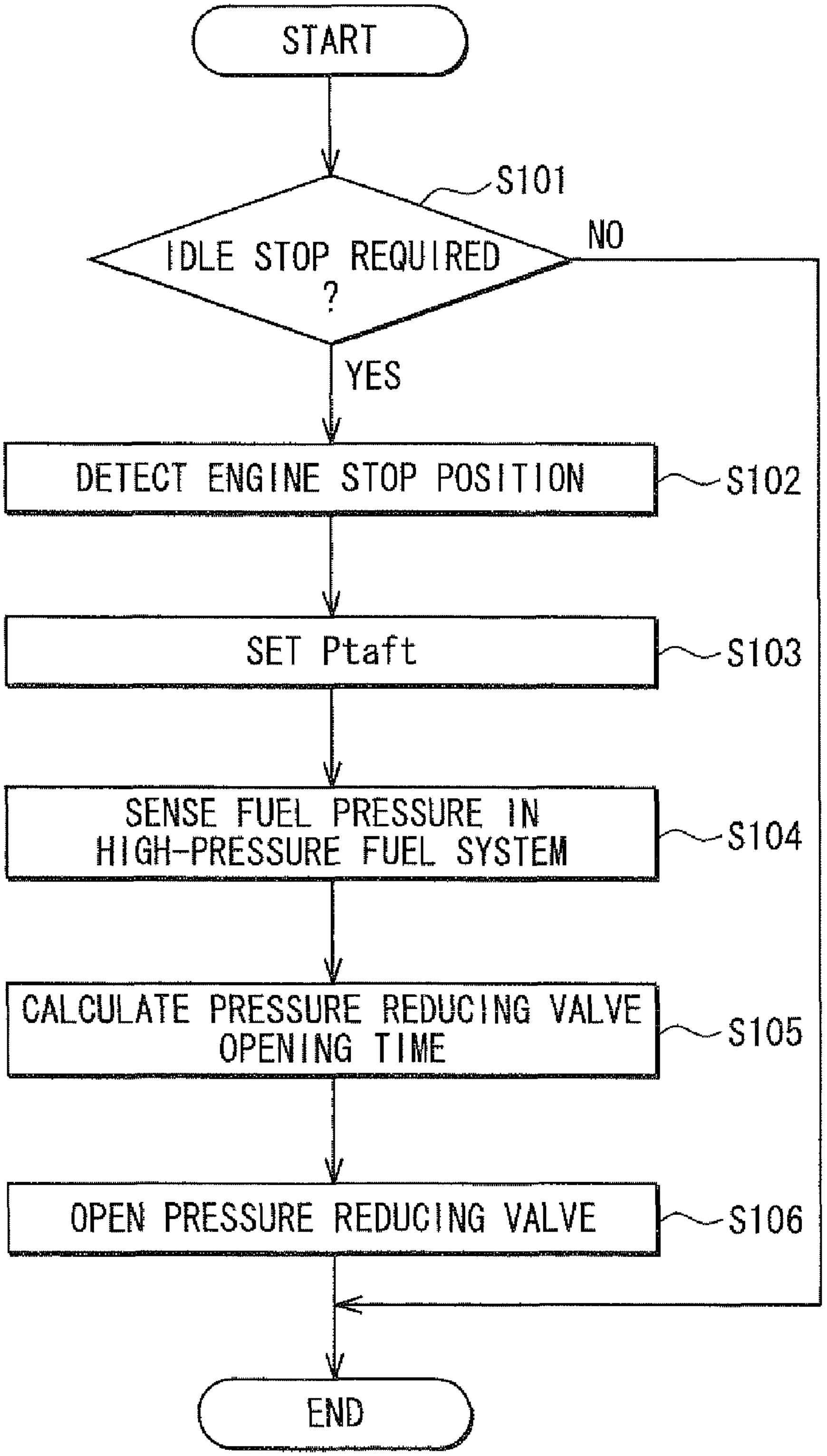
FIG. 3 is a flowchart illustrating a processing flow of an after-stop fuel pressure control routine according to the embodiment.

Therefore, in the present embodiment, the ECU 37 performs an after-stop fuel pressure control routine shown in FIG. 3 mentioned in detail later. Thus, the ECU 37 sets the after-stop target fuel pressure in accordance with the engine stop position detected by the above-mentioned engine stop position detection method when the engine stops (when the idle stop occurs). The ECU 37 controls the opening/closing action (i.e., ON/OFF of the energization) of the pressure reducing valve 29 to reduce the fuel pressure in the high-pressure fuel system to the after-stop target fuel pressure after the engine stops.

Figure 4:
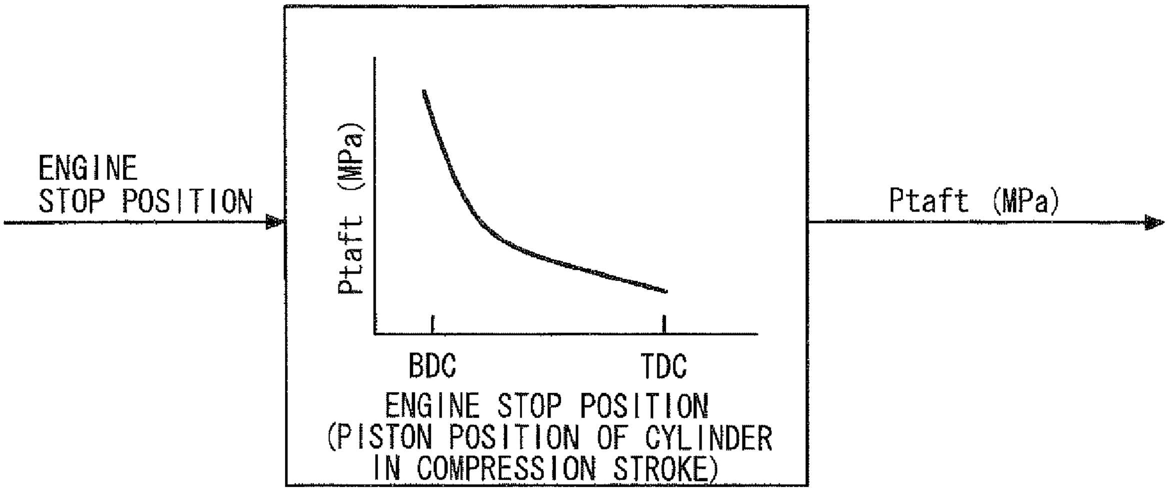
FIG. 4 is a diagram explaining processing for setting after-stop target fuel pressure from an engine stop position according to the embodiment.

In this case, the after-stop target fuel pressure Ptaft is set as shown in FIG. 4. That is, the maximum cylinder pressure of the cylinder in the compression stroke as of the restart (i.e., the cylinder pressure at the time when the piston ascends to the top dead center (TDC)) decreases as the piston position of the cylinder in the compression stroke at the engine stop position is closer to the top dead center TDC. The fuel injection pressure (i.e., differential pressure between the fuel pressure and the maximum cylinder pressure) necessary for the single compression starting can be secured with lower fuel pressure as the maximum cylinder pressure of the cylinder in the compression stroke decreases. Therefore, the after-stop target fuel pressure Ptaft is set to be lower as the piston position of the cylinder in the compression stroke at the engine stop position is closer to the top dead center TDC as shown in FIG. 4, BDC in FIG. 4 indicates the bottom dead center.

Figure 5:
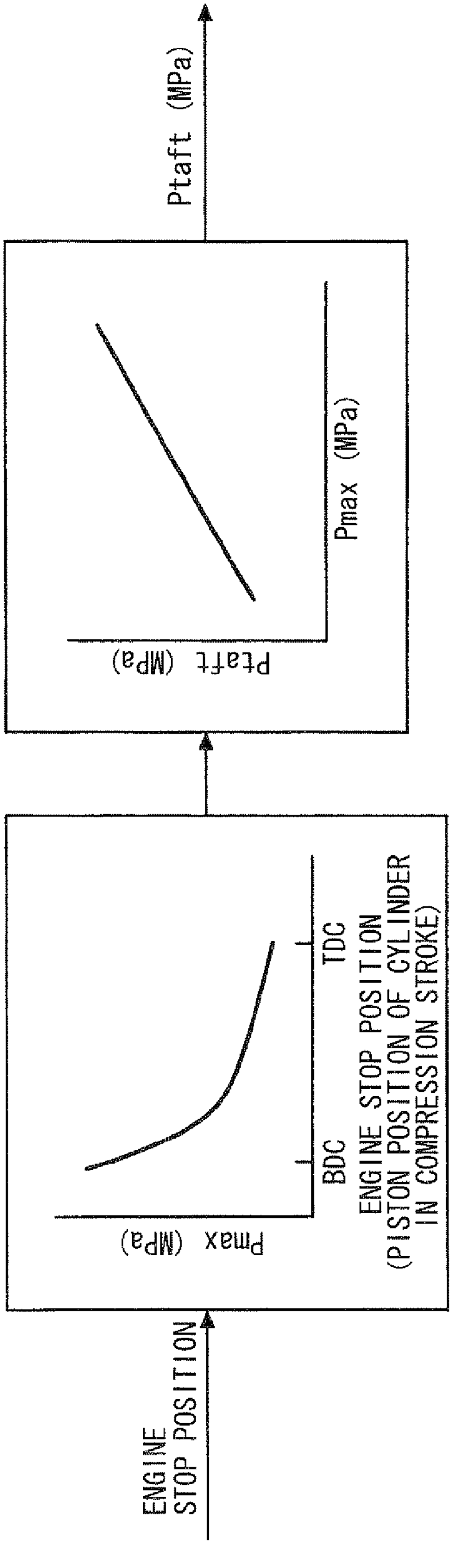
FIG. 5 is another diagram explaining processing for setting the after-stop target fuel pressure from the engine stop position according to the embodiment.

Alternatively, as shown in FIG. 5, the maximum cylinder pressure Pmax of the cylinder in the compression stroke at the engine stop position (i.e., the cylinder pressure at the time when the piston of the cylinder in the compression stroke ascends to the top dead center TDC in the restart) may be estimated, and the after-stop target fuel pressure Ptaft may be set higher than the estimated maximum cylinder pressure Pmax by predetermined pressure. By setting the predetermined pressure at the minimum necessary fuel injection pressure (i.e., differential pressure between the fuel pressure and the maximum cylinder pressure Pmax) necessary for the single compression starting, the minimum necessary fuel injection pressure necessary for the single compression starting can be surely secured in accordance with the engine stop position.

In an example of FIG. 5, a map for estimating the maximum cylinder pressure Pmax from the engine stop position and a map for setting the after-stop target fuel pressure Ptaft from the estimated maximum cylinder pressure Pmax are produced respectively. Alternatively, a relationship between the engine stop position and the after-stop target fuel pressure Ptaft of FIG. 5 may be assigned to a single map, and the after-stop target fuel pressure Ptaft of FIG. 5 may be set from the engine stop position. In this case, the processing for estimating the maximum cylinder pressure Pmax from the engine stop position is unnecessary.

The above-explained after-stop fuel pressure control according to the present embodiment is performed by the ECU 37 according to the after-stop fuel pressure control routine shown in FIG. 3 as follows. The ECU 37 repeatedly executes the after-stop fuel pressure control routine of FIG. 3 in a predetermined cycle during the engine operation and functions as an after-stop fuel pressure controlling section. If the routine is started, first in S101 (S means "Step"), it is determined whether the idle stop is required (i.e., whether an idle stop condition is satisfied). If it is determined that the idle stop is required, the process proceeds to S102. In S102, the engine stop position where the engine rotation finally stops is detected by the above-described engine stop position detection method. The processing of S102 functions as an engine stop position determining section.

Then, the process proceeds to S103, in which the after-stop target fuel pressure Ptaft corresponding to the present engine stop position is set using the map of FIG. 4. Alternatively, the maximum cylinder pressure Pmax of the cylinder in the compression stroke at the engine stop position (i.e., the cylinder pressure at the time when the piston of the cylinder in the compression stroke ascends to the top dead center in the restart) may be estimated and the after-stop target fuel pressure Ptaft may be set such that the after-stop target fuel pressure Ptaft is higher than the estimated maximum cylinder pressure Pmax by predetermined pressure with reference to the maps of FIG. 5. The predetermined pressure is set at minimum necessary fuel injection pressure (i.e., the differential pressure between the fuel pressure and the maximum cylinder pressure) for the single compression starting. The processing of S103 functions as an after-stop target pressure setting section.

Then, the process proceeds to S104, in which the output signal of the fuel pressure sensor 35 is read to sense the fuel pressure in the high-pressure fuel system. In following S105, the valve opening time T (the ON time) of the pressure reducing valve 29 is calculated based on the differential pressure between the fuel pressure in the high-pressure fuel system and the after-stop target fuel pressure Ptaft with reference to a map or the like. Thus, the valve opening time T of the pressure reducing valve 29 (i.e., time to reduce the fuel pressure in the high-pressure fuel system) is set longer as the differential pressure between the fuel pressure in the high-pressure fuel system and the after-stop target fuel pressure Ptaft increases. Then, the process proceeds to S106, in which the energization to the pressure reducing valve 29 is switched on during the valve opening time T calculated in above-described S105 to open the pressure reducing valve 29, thereby reducing the fuel pressure in the high-pressure fuel system to the after-stop target fuel pressure Ptaft. Then, the energization to the pressure reducing valve 29 is switched off to close the pressure reducing valve 29 when the valve opening time T elapses. Thus, the fuel pressure in the high-pressure fuel system is held to the after-stop target fuel pressure Ptaft.

In above-described S105 and S106, the fuel pressure in the high-pressure fuel system is reduced to the after-stop target fuel pressure Ptaft by controlling the valve opening time T (the ON time) of the pressure reducing valve 29. Alternatively, the energization to the pressure reducing valve 29 may be switched on to open the pressure reducing valve 29 and the energization to the pressure reducing valve 29 may be switched off to close the pressure reducing valve 29 when the fuel pressure in the high-pressure fuel system sensed with the fuel pressure sensor 35 is reduced to the after-stop target fuel pressure Ptaft, thereby reducing the fuel pressure in the high-pressure fuel system to the after-stop target fuel pressure Ptaft.

According to the above-described embodiment, the after-stop target fuel pressure is set in accordance with the engine stop position. Therefore, the after-stop target fuel pressure can be set in accordance with the engine stop position such that the fuel pressure in the high-pressure fuel system is reduced to as low fuel pressure as possible within a range, in which the single compression starting is possible. Thus, by setting the after-stop target fuel pressure in accordance with the engine stop position, the single compression starting can be performed even at the engine stop position where the single compression starting has failed conventionally, while reducing the fuel leakage (the oil-tightness leakage) from the injector 34 during the engine stoppage.

In the above-described embodiment, the after-stop fuel pressure control for reducing the fuel pressure in the high-pressure fuel system to the after-stop target fuel pressure is performed during the idle stop. Alternatively, the after-stop fuel pressure control for reducing the fuel pressure in the high-pressure fuel system to the after-stop target fuel pressure may be performed also during manual engine stop, which is performed through OFF operation of an ignition switch. In this case, the after-stop target fuel pressure in the manual engine stop may be set identical to the after-stop target fuel pressure in the idle stop. Alternatively, the after-stop target fuel pressure in the manual engine stop may be set lower than the after-stop target fuel pressure in the idle stop.

Figure 6:
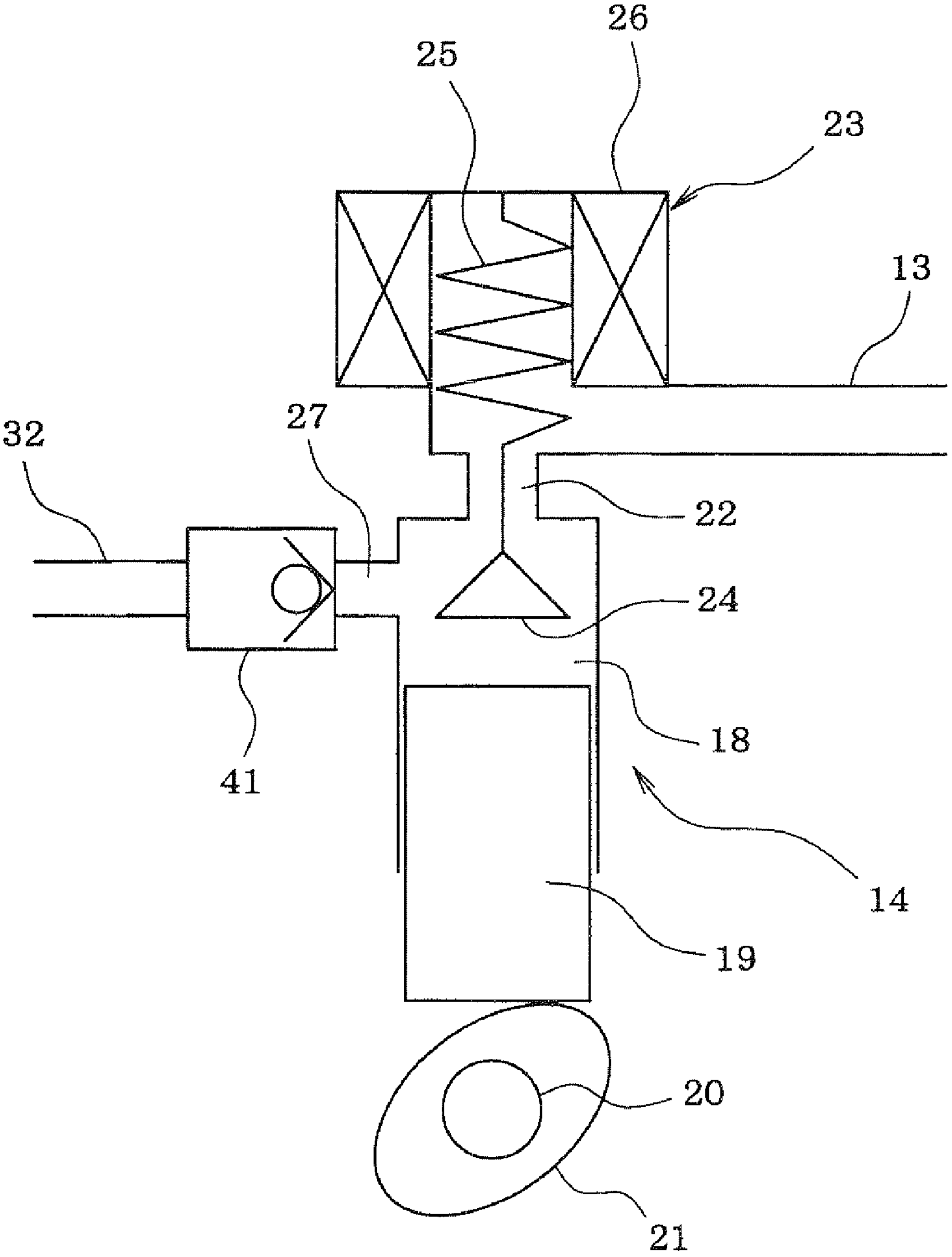
FIG. 6 is a schematic configuration diagram illustrating a high-pressure pump according to another embodiment of the present invention.

In the above-described embodiment, the pressure reducing valve 29 is provided in the bypass flow passage 36, which bypasses the check valve 28 provided on the discharge port 27 side of the high-pressure pump 14, thereby constituting the pressure reducing mechanism that reduces the fuel pressure in the high-pressure fuel system. Alternatively, as shown in FIG. 6, an electromagnetic check valve 41 may be provided on the discharge port 27 side of the high-pressure pump 14, and the fuel pressure in the high-pressure fuel system may be reduced to the after-stop target fuel pressure by switching on energization to the check valve 41 and by compulsorily opening the check valve 41 during the engine stoppage.

The position for installing the pressure reducing mechanism for reducing the fuel pressure in the high-pressure fuel system is not limited to the high-pressure pump 14. For example, the pressure reducing mechanism may be provided in the delivery pipe 33 or the high-pressure fuel pipe 32, and a return pipe for returning part of the fuel in the high-pressure fuel system into the fuel tank 11 may be connected to the pressure reducing mechanism.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An after-stop fuel pressure control device of a direct injection engine including a pressure reducing mechanism for reducing pressure of fuel in a high-pressure fuel system, which supplies high-pressure fuel from a high-pressure pump to an injector, after the engine stops, the after-stop fuel pressure control device comprising:

an engine stop position determining means for detecting or estimating an engine stop position;

an after-stop target fuel pressure setting means for setting after-stop target fuel pressure in accordance with the engine stop position detected or estimated by the engine stop position determining means such that the fuel pressure in the high-pressure fuel system is reduced to as low fuel pressure as possible within a range, in which single compression starting is possible, wherein the single compression starting is to start the engine by causing a first explosion in a cylinder that is in a first compression stroke at an engine start; and an after-stop fuel pressure controlling means for controlling the pressure reducing mechanism to reduce the fuel pressure in the high-pressure fuel system to the after-stop target fuel pressure after the engine stops.

2. The after-stop fuel pressure control device as in claim 1, wherein the after-stop target fuel pressure setting means sets the after-stop target fuel pressure to be lower as a piston position of a cylinder in a compression stroke at the engine stop position is closer to a top dead center.

3. The after-stop fuel pressure control device as in claim 1, wherein the after-stop target fuel pressure setting means sets the after-stop target fuel pressure such that the after-stop target fuel pressure is higher than cylinder pressure at a time when a piston of a cylinder in a compression stroke at the engine stop position ascends to a top dead center in restart by predetermined pressure.

4. The after-stop fuel pressure control device as in claim 1, further comprising:

an idle stop means for controlling automatic stop and automatic restart of the engine, wherein the after-stop fuel pressure controlling means reduces the fuel pressure in the high-pressure fuel system to the after-stop target fuel pressure during the automatic stop of the engine performed by the idle stop means, and the idle stop means performs fuel injection and ignition in a cylinder in the first compression stroke in the automatic restart, thereby causing the first explosion and starting the engine.

5. A method of controlling after-stop fuel pressure of a direct injection engine including a pressure reducing mechanism for reducing pressure of fuel in a high-pressure fuel system, which supplies high-pressure fuel from a high-pressure pump to an injector, after the engine stops, the method comprising:

detecting or estimating an engine stop position;

setting a after-stop target fuel pressure in accordance with the detected or estimated engine stop position such that the fuel pressure in the high-pressure fuel system is reduced to as low fuel pressure as possible within a range, in which single compression starting is possible, wherein the single compression starting is to start the engine by causing a first explosion in a cylinder that is in a first compression stroke at an engine start; and controlling the pressure reducing mechanism to reduce the fuel pressure in the high-pressure fuel system to the after-stop target fuel pressure after the engine stops.

6. The method as in claim 5, wherein said setting the after-stop target fuel pressure includes setting the after-stop target fuel pressure to be lower as a piston position of a cylinder in a compression stroke at the engine stop position is closer to a top dead center.

7. The method as in claim 5, wherein said setting the after-stop target fuel pressure includes setting the after-stop target fuel pressure such that the after-stop target fuel pressure is higher than cylinder pressure at a time when a piston of a cylinder in a compression stroke at the engine stop position ascends to a top dead center in restart by predetermined pressure.

8. The method as in claim 5, further comprising:

controlling automatic stop and automatic restart of the engine, wherein said controlling the after-stop fuel pressure includes reducing the fuel pressure in the high-pressure fuel system to the after-stop target fuel pressure during performance of the automatic stop of the engine, and said controlling the automatic stop and automatic restart of the engine includes performing fuel injection and ignition in a cylinder in the first compression stroke in the automatic restart, thereby causing the first explosion and starting the engine.

* * * * *